United States Patent [19]

Foster

[11] Patent Number: 4,709,805
[45] Date of Patent: Dec. 1, 1987

[54] DRIVE/FRAME ASSEMBLY FOR RECIPROCATING FLOOR CONVEYOR

[76] Inventor: Raymond K. Foster, P.O. Box 1, Madras, Oreg. 97741

[21] Appl. No.: 680,370

[22] Filed: Dec. 11, 1984

Related U.S. Application Data

[63] Continuation-in-part of Ser. No. 477,767, Mar. 22, 1983.

[51] Int. Cl.$^4$ .............................................. B65G 25/00
[52] U.S. Cl. ...................................... 198/750; 198/775
[58] Field of Search .............................. 198/750, 775; 414/525 B, 525 R, 509; 92/117 R

[56] References Cited

U.S. PATENT DOCUMENTS

| | | | |
|---|---|---|---|
| 1,977,696 | 10/1934 | Purdy | 92/117 R |
| 2,550,925 | 5/1951 | Weimar | 92/117 R |
| 2,629,504 | 2/1953 | Peterson | 214/83.3 |
| 2,973,856 | 3/1961 | Brooks | 198/219 |
| 3,534,875 | 10/1970 | Hallstrom, Jr. | 214/83.3 |
| 3,905,290 | 9/1975 | Caughey | 100/215 |
| 4,143,760 | 3/1979 | Hallstrom | 198/750 |
| 4,144,963 | 3/1979 | Hallstrom | 198/750 |
| 4,184,587 | 1/1980 | Hallstrom | 198/750 |
| 4,474,285 | 10/1984 | Foster | 198/750 |
| 4,492,303 | 1/1985 | Foster | 198/750 |

FOREIGN PATENT DOCUMENTS 1296087  5/1969  Fed. Rep. of Germany.
6706657  11/1968  Netherlands.

Primary Examiner—Robert J. Spar
Assistant Examiner—Lyle Kimms
Attorney, Agent, or Firm—Delbert J. Barnard

[57] ABSTRACT

This invention relates to improvements in reciprocating floor conveyors. A problem with some reciprocating floor conveyors is that they are not capable of being mounted in relatively narrow spaces. This invention divides the hydraulic drive assembly into two small size assemblies, each of which is capable of being mounted into a relatively narrow space. In each assembly, piston rod portions (42, 45, 44, 48) of two linear hydraulic motors (16, 20, 18, 22) are connected at their opposite ends to two spaced apart transverse frame members (50, 52, 54, 56). A cylinder (84) is driven back and forth along each piston rod (42, 46, 44, 48). Two transverse drive beams (24, 28, 26, 30) are provided. Each drive beam (24, 28, 26, 30) is directly connected to an associated one of the cylinders (84). The transverse drive beams (24, 28) of the first assembly are connected to the first and third set of floor slat members (40). The transverse drive beams (26, 30) of the second assembly are connected to the second and fourth set of floor slat members (40). The two assemblies (10, 12) are axially spaced apart. The linear hydraulic motors (16, 18, 20, 22) are operated for simultaneously moving the floor slat members (40) in one direction, for advancing a load, and for sequentially retracting them in the opposite direction.

12 Claims, 14 Drawing Figures

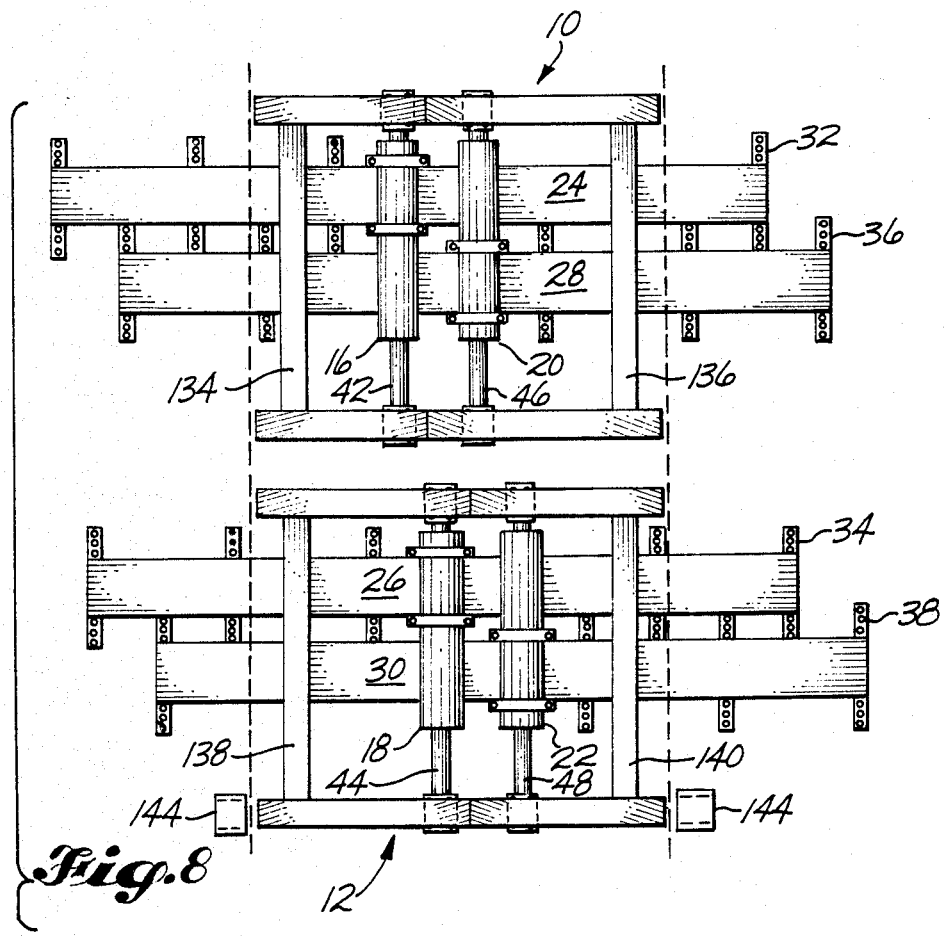

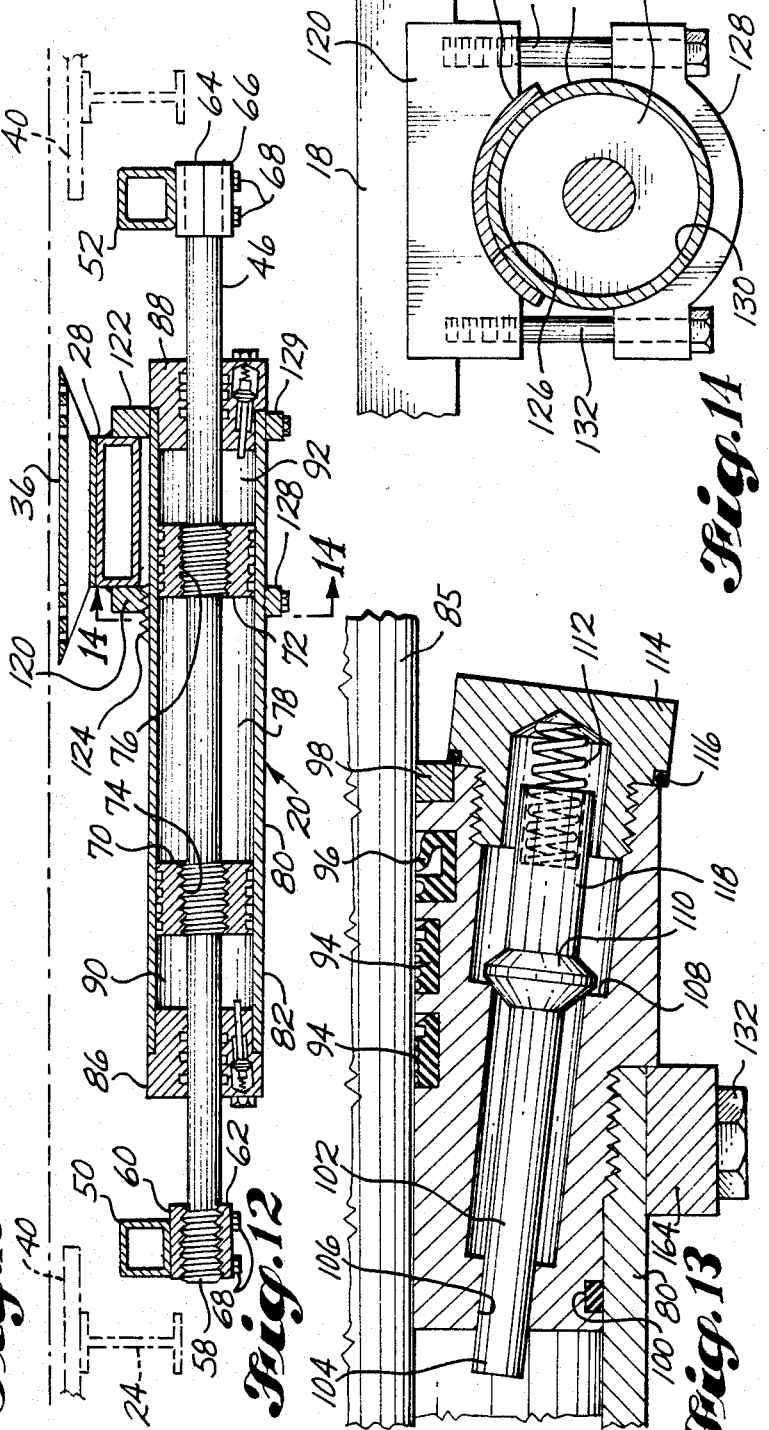

DRIVE/FRAME ASSEMBLY FOR RECIPROCATING FLOOR CONVEYOR

This is a continuation-in-part of my co-pending application Ser. No. 477,767, filed Mar. 22, 1983, pending, and entitled Reduced Size Drive/Frame Assembly For A Reciprocating Floor Conveyor.

TECHNICAL FIELD

This invention relates to improvements in reciprocating floor conveyors, and in particular to the provision of small size, lightweight, hydraulic drive unit and support frame assemblies.

RELATED APPLICATIONS

This is related to application Ser. No. 346,863, filed Feb. 2, 1982, and entitled Drive Unit Mount for Reciprocating Floor Conveyor now U.S. Pat. No. 4,474,285, granted Oct. 2, 1984.

BACKGROUND INFORMATION

Reciprocating floor conveyors are a relatively recent development. Basically, they comprise at least one group of at least three elongated floor members and a hydraulic drive system which operates to drive at least a majority of the floor members in unison in the desired conveying direction, and to retract them individually. Systems are in use in which all of the floor members are driven in unison, in the desired conveying direction, and are then individually retracted sequentially. It has also been proposed to drive a majority of the floor slat members in the desired conveying direction while at the same time retracting the remaining floor slat members. The present invention has application with both types of systems.

For background purposes, reference is made to U. S. Pat. No. 4,143,760, granted Mar. 13, 1979, to U.S. Pat. No. 4,144,963, granted Mar. 20, 1979 and to U.S. Pat. No. 4,184,587, granted Jan. 22, 1980, all to Olaf A. Hallstrom. Reference is also made to my aforementioned co-pending application Ser. No. 477,767, to my aforementioned U.S. Pat. No. 4,492,303 and to my co-pending application Ser. No. 346,856, filed on Feb. 8, 1982, and entitled Drive/Guide Systems for a Reciprocating Floor Conveyor, now U.S. Pat. No. 4,474,285, granted Jan. 8, 1985.

Earlier forms of reciprocating floor conveyors are disclosed by U.S. Pat. No. 2,629,504, granted in February of 1953, to Peterson; by U.S. Pat. No. 2,973,856, granted in March of 1961 to Brooks; by U. S. Pat. No. 3,534,875, granted in October of 1970 to Hallstrom; by West German Patent Publication No. 1,296,087, published in May of 1969; and by U.S. Pat. No. 3,905,290, granted Sept. 16, 1975 to Caughey. These patents are not particularly pertinent to the subject invention and require no further comment, but should be considered for purposes of putting the subject invention into proper perspective relative to the prior art.

DISCLOSURE OF INVENTION

The present invention provides a smaller and lighter weight modular type drive assembly than previously known.

In accordance with an aspect of the present invention, a pair of reversible linear hydraulic drive units are mounted together on a frame. The frame comprises a pair of spaced apart transverse frame members. Each of the two reversible linear hydraulic drive units comprises an elongated piston rod having two opposite end mounting portions, a piston portion fixed onto a mid part of the piston rod, and a cylinder mounted to reciprocate back and forth on said piston rod. The cylinder and the piston portion together define two variable volume chambers, one outwardly from each end of the piston portion. The assembly includes means for securing the opposite end mounting portions of the piston rods to mid portions of the transverse frame members, such that the piston rods structurally interconnect the two transverse frame members. The assembly further comprises means for connecting each cylinder to a separate set of floor slat members.

In preferred form, two assemblies of the type described are used together. Each assembly is positioned endwise of the other in the direction of floor slat member movement. The first assembly includes cylinders which are connecteed to the first and third sets of floor slat members of a four set floor. The second assembly includes a pair of cylinders which are connected to the second and fourth sets of the floor slat members.

Other more detailed features of the invention are described in the description of the preferred embodiment and are particularly pointed out in the appended claims.

BRIEF DESCRIPTION OF THE DRAWINGS

In the drawings, like element designations refer to like parts throughout, and

FIG. 8 is a bottom plan view of the two frame drive system shown by FIG. 7;

FIG. 9 is an end view of one of the assemblies, showing a preferred manner of securing it to a main frame structure;

FIG. 10 is a side elevational view of one of the assemblies shown by FIGS. 7 and 8, with a foreground portion broken away for clarity of illustration of the components which are positioned behind it;

FIG. 11 is a sectional view taken substantially along line 11—11 of FIG. 7;

FIG. 12 is a sectional view taken substantially along line 12—12 of FIG. 7;

FIG. 13 is an enlarged scale fragmentary view of the end portion of the cylinder body shown in FIG. 12; and FIG. 14 is a sectional view taken substantially along line 14—14 of FIG. 12.

BEST MODES FOR CARRYING OUT THE INVENTION

FIGS. 1–6 are sequence of operation views which illustrate how the reciprocating floor conveyor works. These figures show two groups of floor slat members. Each group comprises four independent floor slat members designated 1, 2, 3 and 4. The members "1" move together. The members "2" move together. The members "3" move together. And, the members "4" move together.

It is to be understood that the two groups are illustrated for example purposes only. Most embodiments would include substantially larger number of groups of floor slat members.

Figure 1:
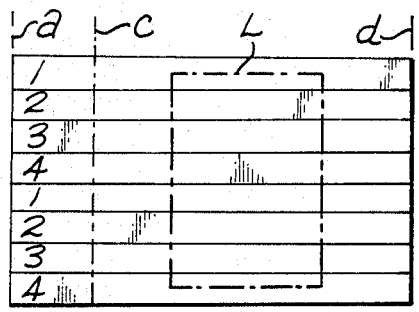
FIG. 1 is a top plan diagram of a conveyor which includes four floor slat members per group with each common floor slat member being identified by a common number, such conveyor being shown in a fully retracted position.
Figure 2:
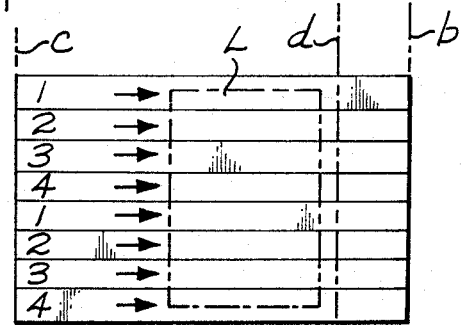
FIG. 2 is a view like FIG. 1, but showing all of the floor slat members being advanced in unison to convey a load in the direction indicated by arrows.
Figure 3:
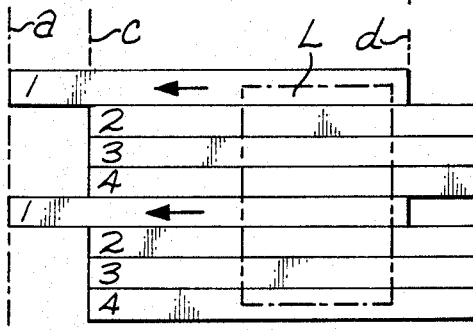
FIG. 3 is a view like FIGS. 1 and 2, showing floor slat members 2, 3 and 4 stationary, while floor slat members 1 are being retracted.
Figure 3:
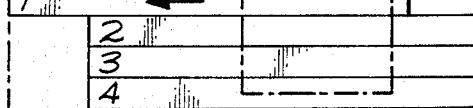
Figure 4:
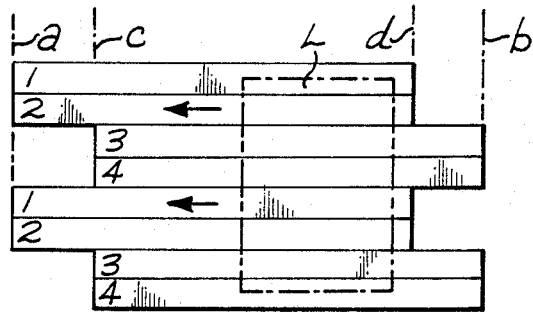
FIG. 4 is a view like FIG. 1-3, but showing floor slat members 1, 3 and 4 stationary while floor slat members 2 are being retracted.
Figure 5:
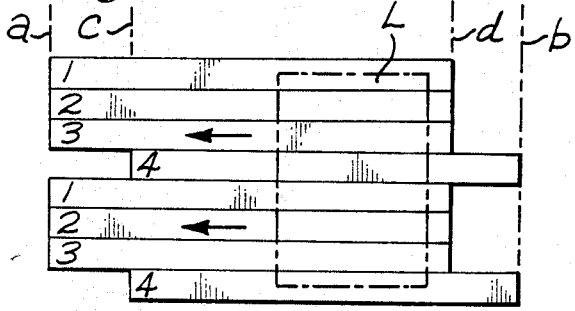
FIG. 5 is a view like FIGS. 1-4, but showing floor slat members 1, 2 and 4 stationary and floor slat members 3 being retracted.
Figure 6:
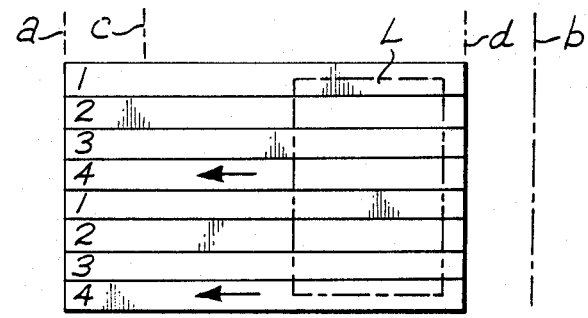
FIG. 6 is a view like FIGS. 1-5, but showing floor slat members 1-3 stationary and floor slat members 4 being retracted.

FIG. 1 shows all of the floor slat members in a retracted position in which the common ends are aligned at a start station a. A load is shown centrally positioned on the floor. FIG. 2 shows all of the floor members being advanced together to move the Load forwardly and the opposite ends of the floor members to a fully advanced position b. FIG. 3 shows the group "1" floor members being retracted and the groups "2","3" and "4" floor members being held stationary. The load does not move because the frictional forces exerted on it by the stationary floor members are larger than the frictional forces exerted on it by the retracting floor member "1". FIG. 4 shows the next step in the sequence. The retracted floor members "1" and the still advanced floor members "3" and "4" are held stationary and the floor members "2" are retracted. Again, the load does not move. FIG. 5 shows retracted floor members "1" and "2", and still advanced floor members "4", stationary and the floor members "3" being retracted. Again, the Load does not move. FIG. 6 shows retracted floor members "1", "2" and "3" stationary and floor members "4" being retracted. Again, the load does not move. In this example, the load has moved a distance equal to the endwise movement of the floor, viz. a-c or d-b.

Figure 7:
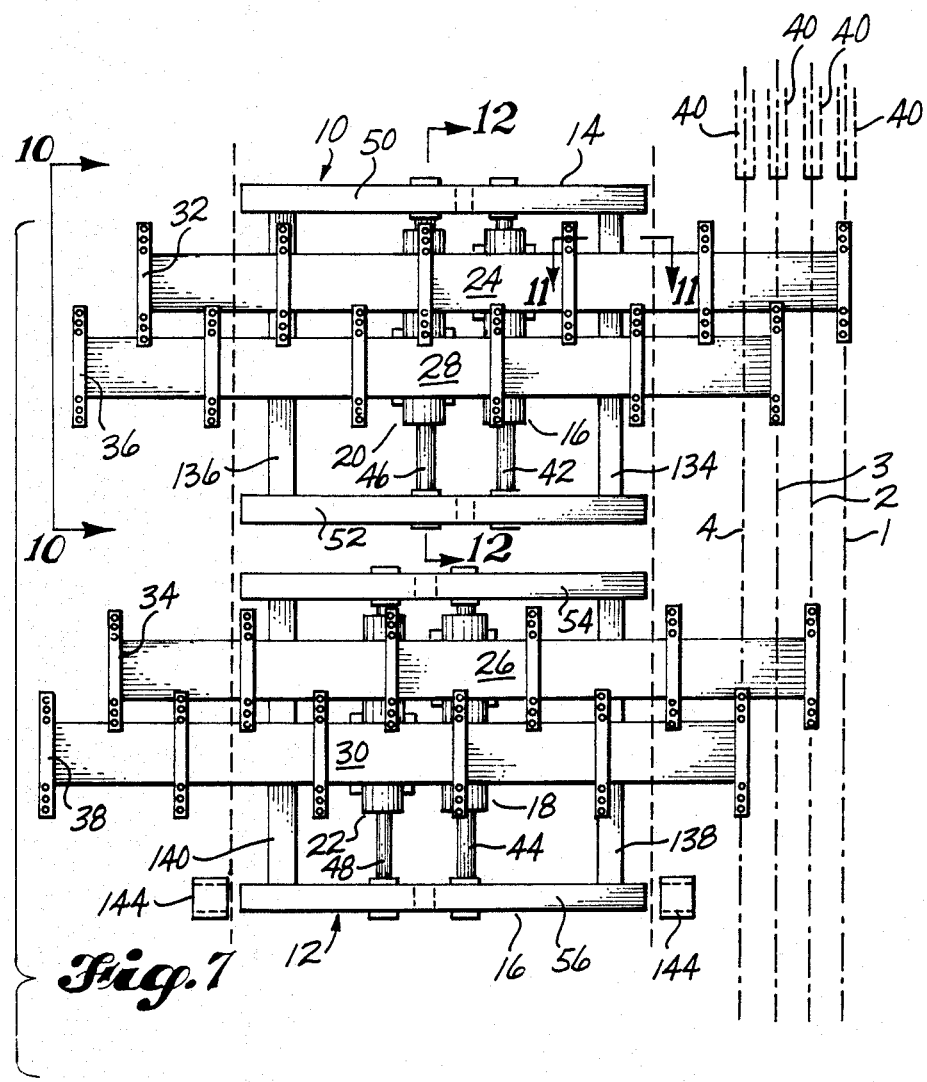
FIG. 7 is a top plan view of an embodiment of the drive assembly of the present invention, with the floor slat members omitted, but including a parallel broken line showing the center lines of a first group of floor members 1-4.

Referring now to FIG. 7-9, the drive mechanism which is illustrated is adapted to be installed within a space provided for it within a main support frame of a vehicle or a stationary installation. The system of this invention is particularly adapted for installation into a space which is limited laterally of the floor but is not so limited longitudinally of the floor.

In preferred form, the drive system comprises two separate drive assemblies 10, 12, each having a separate frame 14, 16.

The drive system comprises four hydraulic drive units 16, 18, 20, 22. The drive units 16, 18, 20, 22 function to reciprocate a like number of transverse drive beams 24, 26, 28, 30. As best shown by FIG. 7, when the drive system is installed, the transverse drive beams 24, 26, 28, 30 are positioned to reciprocate within a space defined at its ends by the end positions of beams 24, 30 when the drive units 16, 22 are in their outward end positions of travel. Functionally speaking, the drive system is essentially like the drive system that is disclosed in the aforementioned U.S. Pat. No. 4,184,587, except for the number of transverse drive beams. That is, the drive beams are connected to the floor slat members in essentially the same way. The space in which the drive members reciprocate is bounded, at least at one of its ends, by guide tubes for the floor slat members which are in axial alignment with connector members 32, 34, 36, 38 which are attached to upper portions of the transverse drive beams 24 26, 28, 30, respectively. In FIG. 7 end portions of an illustrative view of the guide beams 40 are shown in phantom. Reference is made to applicant's aforementioned copending application Ser. No. 346,865 for a complete disclosure of the relationship of the connectors 32, 34, 36, 38, the guide beams 40 and the floor slat members.

As shown by FIGS. 7 and 8, a plurality of connectors 32 are connected to and move with the transverse drive beam 24. A plurality of connectors 34 are connected to and move with the transverse drive beam 26. A plurality of connectors 36 are connected to and move with the transverse drive beam 28. A plurality of connectors 38 are connected to and move with the transverse drive beam 30.

By way of example, the floor slat members "1" may be connected to the connectors 32. The floor slat members "2" may be connected to the connectors 34. The floor slat members "3" may be connected to the connectors 36. And, the floor slat members "4" may be connected to the connectors 38.

Preferably, the connectors 32, 34, 36, 38 are welded to the transverse drive beams 24, 26, 28, 30. The floor slat members "1", "2", "3", "4" are secured to the connectors 32, 34, 36, 38 by means of bolts or other suitable fasteners which extend through openings in the floor members and the connectors.

Aside from there connections to the connectors 32, 34, 36, 38, the floor slat members "1", "2", "3" and "4" are free to move. The guide beams 40 are provided to guide their movement and plastic slide bearings (not shown) are provided to facilitate movement. The arrangement and function of the plastic slide bearings is fully disclosed in my aforementioned co-pending application Ser. No. 346,865.

As shown by FIGS. 7 and 8, the two drive assemblies 10, 12 are identical in component makeup, but the positions of the components differ, in a manner and for reasons to be hereinafter described.

In the illustrated embodiment, the drive units 16, 18, 20, 22 are identical. Each comprises a piston rod 42, 44, 46, 48 having opposite end mounting portions by which they are secured to a pair of transverse frame beams. Rods 42, 46 are secured to transverse frame beams 50, 52. Piston rods 44, 48 are secured to transverse frame members 54, 56.

The further details of the hydraulic units 16, 18, 20, 22 will be described with reference to hydraulic unit 20 which is shown in section in FIG. 12. It is to be understood that the details of the other hydraulic units 16, 18, 20, 22 are the same.

Referring to FIG. 12, a pair of clamp blocks are provided at each end of the piston rod 46. The piston rod is preferably threaded or otherwise machined at one end 58 and the clamp blocks 60, 62 at the end have matching internal threads or machining so that they will grip the end portion 58 of the rod 46 and restrain it from movement in the axial direction. The opposite end portion of the rod 46 may be smooth and the clamp blocks 64, 66 at that end may have semi-cylindrical clamp surfaces which grip such end portion of the rod 46.

The upper clamp locks 60, 64 are welded to the transverse frame members 50, 52, which may be tubular metal members. The lower clamp blocks 62, 66 are detachably secured in place by bolts 68 which extend through openings in the clamp blocks 62, 66 and thread into threaded openings formed in the clamp blocks 60, 64.

The piston rod 46 includes a piston portion intermediate its ends. In FIG. 12 the piston portion is shown in the form of a pair of spaced apart piston members 70, 72. Preferably the piston rod 46 is threaded in the regions 74, 76 and the piston members 70, 72 are cast directly onto the threaded portions 74, 76. The piston members 70, 72 are then machined to size. The threads or some similar interlock machining at 74, 76 results in the piston members 70, 72 being firmly secured in place on the shaft 46. Each piston member 70, 72 is provided with peripheral grooves for receiving wear rings and seal rings.

The space 78 between piston members 70, 72 is non-functional. Thus, the piston members 70, 72 function as if they were a single member. A single long piston member could be substituted for the two piston members 70, 72 but this is not desirable because it would increase the weight of the drive unit. Or, a short piston could be used which is provided with an axial extention at each end for depressing a check valve operator that will hereinafter be described.

Each of the drive units 16, 18, 20, 22 includes a traveling cylinder body. As shown by FIG. 12, the cylinder body 80 that is mounted to travel along rod 46 includes a cylindrical barrel portion 84 and a pair of end members 86, 88. The end members 86, 88 include reduced diameter inner end portions which are snugly received within the outer ends of the barrel 82. The end member 86, 88 are preferably threaded connected to the end portions of the barrel 82. For purposes of this discussion, the piston portion 70, 72 will be considered to be a single element.

Variable volume chambers 90, 92 are defined at the opposite ends of the piston portion. The fluid porting into and outfrom the chambers 90, 92 is formed in the end members 86, 88.

The hydraulic circuitry is not a part of the present invention and hence it is not disclosed. However, the hydraulic circuit may be basically like the hydraulic circuit that is shown by FIG. 4 of the aforementioned U.S. Pat. No. 4,143,760. The check valves that are shown in U.S. Pat. No. 4,143,760 are built into the end members 86, 88.

Each end member 86, 88 is preferably grooved to receive a pair of wear rings 94, a seal ring 96 and a wiper 98 (FIG. 13). An additional seal ring 100 is provided between the inner end portion of end member 86, 88 and the adjoining inner surface of the cylinder barrel 82.

Referring to FIG. 13, the check valve may include an elongated body 102 having an inner end portion 104 which projects through a bore 106. A shoulder formed at 108 defines a valve seat. A conical surface portion of a valve plug 110 is biased into engagement with the seat by means of a spring 112. Spring 112 is retained by a removable closure 114. An O-ring seal 116 is provided between the head member 114 and an adjoining surface portion of the end member 86, 88. The inner end portion of the spring 112 fits into a socket formed in an end portion 118 of the valve member.

As should be evident, the spring 112 maintains the valve in a seated position except for those times when the piston portion has contracted end portion 104 and has moved the valve member to the right as pictured in FIG. 13, compressing spring 112 as it moves.

Each cross frame member 24, 26, 28, 30 is removably secured to a related one of the hydraulic drive units 16, 18, 20, 22. In the illustrated embodiment this is done by clamps.

Referring to FIGS. 12 and 14 in particular, a pair of upper clamp parts 120, 122 are welded or otherwise secured to each transverse drive beam (28 in FIG. 12) in a position over the cylinder body or barrel 82. Preferably, a machined section 124 is welded to the peripheral portion of the barrel 82 in the vacinity of the clamp 120. Threads or other lock elements are provided onthe outer surface of member 124. The arcuate inner surface 26 of clamp member 120 is formed with interlocking machining so that when the clamp is secured its connection with the drive unit will lock the transverse drive beam 28 to the barrel 82 of the drive unit 20 and will prevent movement between the two in the direction of applied force.

As shown by FIG. 14, each clamp includes a removable lower portion 128 which includes an arcuate inner surface 130 which matches the curvature of the cylinder barrel 82. Securement bolts 132 extend through openings in the removable clamp parts 128, 129 and thread into threaded sockets formed in the fixed clamp parts 120, 122.

The connection of the piston rods of drive shafts 42, 44, 46, 48 to the transverse frame members 50, 52, 54, 56 serve to integrate the parts of the mechanism. It might also be desird to provide the assembly with a pair of longitudinal side beams 134, 136 and 138, 140 which are welded at their ends to the transverse beam members 50, 52 and 54, 56. Members 50, 52, 54, 56 and 134, 136, 138 and 140 may all be lengths of square tubing as shown by FIGS. 10–12. If longitudinal frame members 134, 136 and 138, 140 are employed, strips of a suitable plastic bearing material is secured to the top portions of the members 134, 136 and 138, 140, to provide load carrying support for the transverse drive members 24, 26, 28, 30. A strip of bearing material is designated 142 in FIG. 11.

Each drive assembly 10, 12 may be mounted between two longitudinal beams in the manner disclosed in my aforementioned co-pending application Ser. No. 346,863. Such manner of installation requires the use of tubular mounting members, two of which are shown in FIGS. 7 and 9 and are designated 144 in such figures. As disclosed in application Ser. No. 346,863, a tubular member like 144 is provided at each end of each member 50, 52, 54, 56. The length of members 50, 52, 54, 56 is slightly less then the lateral spacing between the two main frame beams 146, 148 (FIG. 9.) The members 144 are installed on the end portions of the members 50, 52, 54, 56 and are moved endwise inwardly. Then, the mechanism is positioned between the two main frame beams 146, 148. Then, the members 144 are moved telescopically outwardly and at their outer ends are welded to the main frame beams 146, 148. In such position they still receive an overlap end portions of the members 50, 52, 54, 56. Then, they are welded at their inner ends to the members 50, 52, 54, 56. In some installations it is also desirable to weld in diagonal bracing or other bracing members.

Referring to FIG. 9, Each member 50, 52, 54, 56 may be provided with a pair of diagonal members 150, 152 which are welded at their opposite ends to lower portions of the transverse frame member 56 (in FIG. 9). The transverse members 150, 152 slope inwardly and downwardly from their locations of connections to member 56. They meet at their inner ends and are welded together at their inner ends. Also, a vertical frame member number 154 may be interconnected between the mid-portion of the transverse frame member 56 and the inner ends of the diagonal members 150, 152. Of course, diagonal members and a vertical frame member may be also associated with the transverse members 50, 52 and 54.

As best shown by FIG. 9, the clamp blocks which connect the end portions of the piston rods 42, 44, 46, 48 are secured to the transverse members 50, 52, 54, 56 on opposite sides of the vertical frame member 154.

As shown by FIGS. 7 and 8, the drive units 16, 18, 20 22 are staggered in position laterally across the space into which the two assemblies 10, 12 are mounted. That is, starting with drive unit 16, the next drive unit over is drive unit 18. The next drive unit over is drive unit 20. The last drive unit is drive unit 22. Drive unit 18 is spaced endwide of, but positioned between, drive unit 16, 20. Drive unit 20 is spaced endwise of but spaced between drive units 18, 22.

In preferred form, the longitudinal members 134 and 138 are in end-to-end alignment. Also, the frame members 136, 140 are in end-to-end alignment.

As should be apparent, each drive assembly of the present invention is characterized by a relatively small number of members and a low weight. This is attributable to the fact that the guide rods and pistons are fixed, the cylinder portions of the drive units are movable and the transverse drive beams are directly secured to the cylinder body portions.

The system of the present invention provides a way in which the drive units can be divided up between two separate frames and installed into a space between a pair of beams, or the like, which is relatively narrow.

From the foregoing, various further modifications, component arrangements, and modes of utilization of the reciprocal floor conveyor of the present invention will be apparent to those skilled in the art to which the invention is addressed, within the scope of the following claims.

What is claimed is:

1. For use in a reciprocating floor conveyor of a type comprising at least four sets of floor slat members which are mounted adjacent to each other for longitudinal reciprocation, a first hydraulic drive assembly for simultaneously moving the first and third sets of floor slat members in one direction, for advancing a load, and for sequentially retracting the first and third sets of floor slat members in the opposite direction, and a second hydraulic drive assembly for simultaneously moving the second and fourth sets of floor slat members in one direction, for advancing the load, and for sequentially retracting the second and fourth sets of floor slat members in the opposite direction, said second hydraulic drive assembly being positioned endwise of the first hydraulic drive assembly, in the direction of floor slat member movement, and each said hydraulic drive assembly comprising:

a frame comprising a pair of spaced apart transverse frame members;

a pair of reversible linear hydraulic drive units, each drive unit comprising an elongated piston rod having two opposite end mounting portions, a piston portion fixed on a mid part of the piston rod, and a cylinder body mounted to reciprocate back and forth on said piston rod, said cylinder body and said piston portion together defining two variable volume chambers, one outwardly from each end of the piston portion;

means securing the opposite end mounting portions of said piston rods to mid portions of the transverse frame members;

means for connecting each cylinder body to a separate set of floor slat members; and wherein the division of the drive units between two separate frames enables the placement of the drive assemblies in a relatively narrow space.

2. A system assembly according to claim 1, wherein for each hydraulic drive assembly the means for connecting each cylinder body to its set of floor slat members comprises a transverse drive beam to which the floor slat members are connected and means for detachably connecting such transverse drive beam to the cylinder body of its drive unit.

3. A system assembly according to claim 2, wherein for each hydraulic drive assembly the means for detachably connecting each transverse drive beam to its cylinder body comprises an upper clamp member attached to the transverse drive beam having a lower portion shaped to receive the cylinder body, a lower clamp member having an upper portion shaped to receive the cylinder body, and removable connectors for detachably securing the two clamp members together.

4. A system assembly to claim 3, wherein for each hydraulic drive assembly the cylinder body and at least one of the clamp members include interlocking portions which serve to prevent the cylinder body from moving longitudinally relative to the clamp member.

5. A system assembly according to claim 1, wherein each hydraulic drive assembly further comprises at least two longitudinal frame members interconnected between the transverse frame members, each longitudinal frame member located on an opposite side of the two drive units.

6. A system assembly according to claim 5, wherein each hydraulic drive assembly further includes slide bearing means carried by the longitudinal frame members, and wherein the means for connecting the cylinder bodies to the floor slat members comprises a transverse drive beam for each cylinder, means for interconnecting each transverse drive beam and its set of floor slats, and means for detachably connecting the drive beam to its cylinder body, and wherein the transverse drive beams make sliding contact with said slide bearing means.

7. A system assembly according to claim 1, wherein each said hydraulic drive assembly comprising a pair of diagonal members associated with each transverse frame member, each diagonal member having an outer end portion attached to an end portion of its transverse frame member, and each said diagonal member sloping downwardly and inwardly from its connection with its transverse frame member, to an inner end, and means connecting the two inner ends of the diagonal members together.

8. A system assembly according to claim 7, wherein each said hydraulic drive assembly comprising a vertical frame member associated with each transverse frame member, each said vertical frame member having an upper end which is secured to a mid portion of its transverse frame member, and a lower end which is connected to the inner end portions of the two diagonal members which are associated with such transverse frame member.

9. A system assembly according to claim 8, wherein in each hydraulic drive assembly the end mounting portions of the piston rods are positioned below the transverse frame members, and are secured to said transverse frame members on opposite sides of said vertical member.

10. A system assembly according to claim 1, wherein in each hydraulic drive assembly each transverse frame member includes an outer end portion at each end, and said assembly further including a telescopic connector member for each end portion, each said connector member being telescopically received on its end portion of its transverse frame member, so that the telescopic connector members can be telescopically moved inwardly along the transverse frame member, and the frame positioned between a pair of longitudinally extending, spaced apart main frame members to which said frame is to be attached, and then the telescopic connector members can be moved telescopically outwardly into contact with a main frame member, and then welded to the main frame member, and then be welded to its transverse frame member.

11. A system assembly according to claim 1, wherein the hydraulic drive unit for the second set of floor slat members is positioned between but endwise of the hydraulic drive units for th first and third sets of floor slat members and the hydraulic drive unit for the third set of floor slat members is positioned between but spaced axially from the hydraulic drive units for the second and fourth floor slat members.

12. A system assembly according to claim 1, wherein the end mounting portions of the piston rods are positioned below the transverse frame members, and wherein each drive assembly comprises at least two longitudinal frame members connected between its two transverse frame members, one of said longitudinal frame members being positioned laterally outwardly of one of the hydraulic drive units of the assembly and the second longitudinal frame member being positioned laterally outwardly of the second hydraulic drive unit of the assembly.

13. A system assembly according to claim 12, wherein in each drive assembly a means for connecting each cylinder body to its set of floor slat members comprises a transverse drive beam to which the floor slat members are connected and means for connecting such transverse drive beam to the cylinder body of its drive unit, and wherein each said longitudinal frame member includes a strip of bearing material on its upper portion positioned contiguous the transverse drive beams so that some of any weight on the transverse drive beams can be transferred to the bearing strips and from the bearing strips to the longitudinal frame members, into the frame as a whole, and into the structure the frame is secured to.

* * * * *

UNITED STATES PATENT AND TRADEMARK OFFICE
CERTIFICATE OF CORRECTION

PATENT NO. : 4,709,805  
DATED : December 1, 1987  
INVENTOR(S) : Raymond K. Foster Page 1 of 2

It is certified that error appears in the above-identified patent and that said Letters Patent are hereby corrected as shown below:  Title page:

In the Abstract, the 8th line, "(42, 45, 44, 48)" should be -- (42, 46, 44, 48) --.

In the line below the Abstract, "12 claims" should read -- 13 claims --.

Column 1, line 4, delete "pending".

Column 1, line 43, "U.S. Pat. No. 4,492,303" should be -- U.S. Pat. No. 4,474,285 --.

Column 1, line 44, "Serial No. 346,856" should be -- Serial No. 346,865 --.

Column 1, line 46, "U.S. Pat. No. 4,474,285" should be -- U.S. Pat. No. 4,492,303 --.

Column 2, line 19, "connecteed" should be -- connected --.

Column 3, line 18, after "include", insert -- a --.

Column 5, line 32, "member" should be -- members --.

Column 5, line 39, "outfrom" should be -- out from --.

Column 5, line 66, "contracted" should be -- contacted --.

Column 6, line 10, "vacinity" should be -- vicinity --.

Column 6, line 11, "onthe" should be -- on the --.

UNITED STATES PATENT AND TRADEMARK OFFICE
CERTIFICATE OF CORRECTION

PATENT NO. : 4,709,805

DATED : December 1, 1987

INVENTOR(S) : Raymond K. Foster

It is certified that error appears in the above-identified patent and that said Letters Patent are hereby corrected as shown below:

Column 6, line 29, "desird" should be -- desired --.

Column 6, line 36, "is" should be -- are --.

Column 6, line 59, delete "an" and "overlap" should read -- overlapping --.

Column 7, line 29, after "cylinder", insert -- body --.

Claim 4, column 8, line 27, after "assembly", insert -- according --.

Claim 7, column 8, line 49, "comprising" should be -- comprises --.

Claim 8, column 8, line 59, "comprising" should be -- comprises --.

Claim 11, column 9, line 26, "th" should be -- the --

Signed and Sealed this

Thirty-first Day of May, 1988

Attest:

Attesting Officer

DONALD J. QUIGG

Commissioner of Patents and Trademarks